Jan. 3, 1939. E. W. WEBB 2,142,428
SIDE BEARING
Filed Oct. 7, 1937
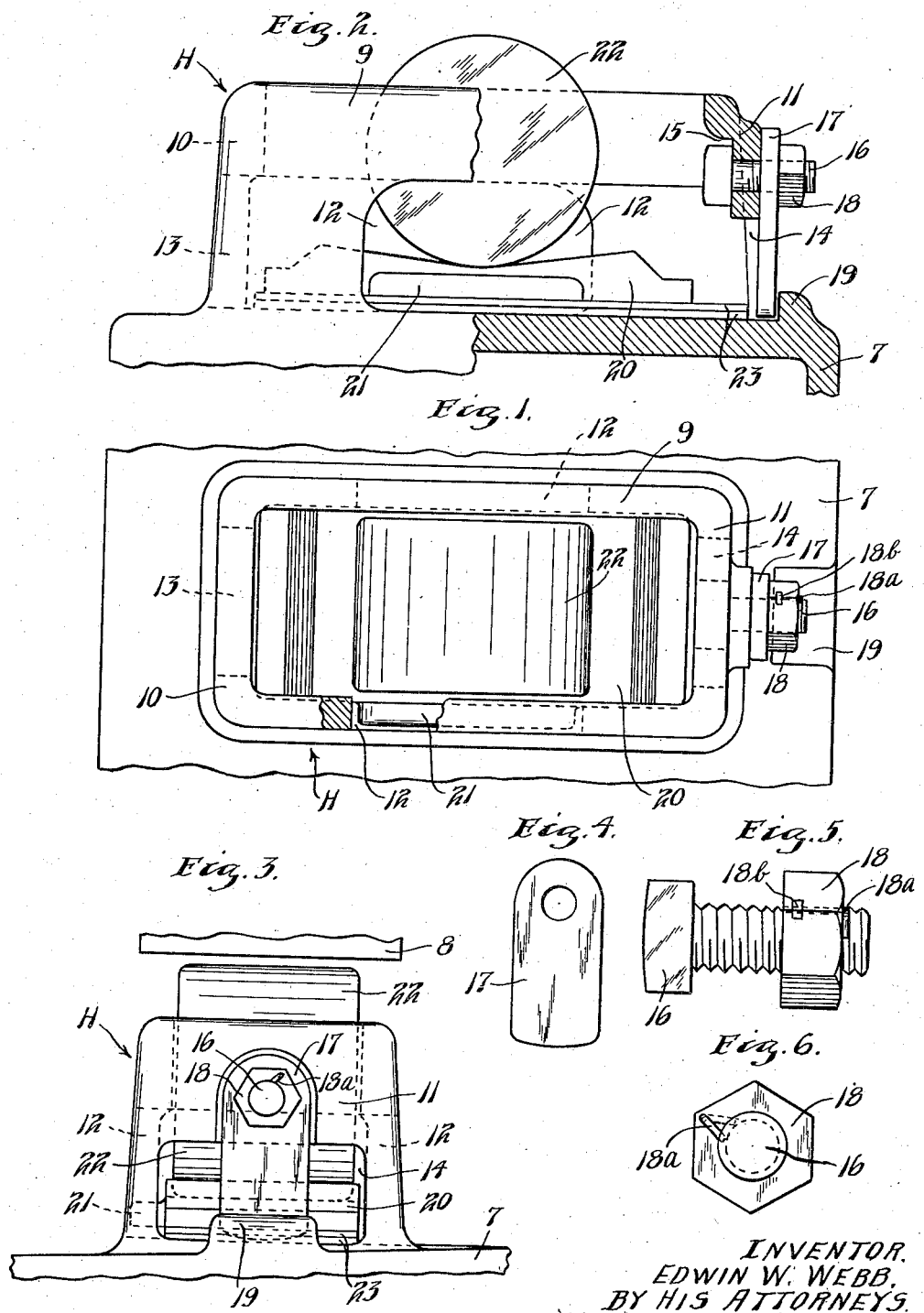
INVENTOR.
EDWIN W. WEBB.
BY HIS ATTORNEYS.
Williamson & Williamson Patented Jan. 3, 1939

2,142,428

UNITED STATES PATENT OFFICE 2,142,428

SIDE BEARING

Edwin W. Webb, Chicago, Ill., assignor to Standard Car Truck Company, Chicago, Ill., a corporation of New Jersey Application October 7, 1937, Serial No. 167,747

2 Claims. (Cl. 308—226)

This invention relates to side bearings for car trucks.

It is the general object of this invention to provide a novel and improved side bearing of cheap and simple construction including a tread plate and bearing member and novel means permitting adjustment of the tread plate and bearing member without disturbing the car truck, said means including structure to take the end thrust imposed upon adjusting shims when the truck is in service.

To this end generally stated, the invention consists in the novel parts and novel combinations of parts hereinafter defined in the claims and described in the following specification, made in connection with the accompanying drawing, wherein like reference characters refer to the same or similar parts throughout the various views, and in which—

Fig. 1 is a plan view of a truck bolster equipped with a side bearing embodying the invention;

Fig. 2 is a view partly in elevation and partly in vertical section looking toward one side of the side bearing shown in Fig. 1;

Fig. 3 is a view in elevation looking toward one end of the same side bearing, part of the body bolster being shown;

Fig. 4 is a view looking toward one side of the gate employed;

Fig. 5 is a view looking toward one side of the lock nut equipped bolt used, and Fig. 6 is a view looking toward one end of the same lock nut equipped bolt.

Referring to the drawing, portions of a truck bolster 7 of a car truck are shown, while portions of the side bearing surface of a body bolster 8 are also illustrated in Fig. 3. Formed integrally with the top of the truck bolster 7 and projecting upwardly therefrom is an open topped side bearing housing H having side walls 9 and end walls 10 and 11 respectively. The side walls 9 are preferably equipped with central openings 12 in their lower portions, while the end wall 10 is also preferably equipped with an opening 13 in its lower portion, this opening 13 being preferably of less length than the spacing between side walls 9.

The other end wall 11 is provided with an opening 14 in its lower portion of a length equal to the spacing between the lower parts of the side walls 9. The central part of the end wall 11 above the opening 14 is outwardly offset somewhat to form an inner bolt head recess 15 adapted to snugly receive the squared head of a bolt 16, the shank of which bolt projects outwardly through an opening in the offset portion of the end wall 11. A swingable gate 17 has an opening in its upper part through which the shank of the bolt 16 projects and this gate normally extends downwardly to a point closely adjacent the top surface of the bolster 7. The lower edge of this gate is preferably of arcuate formation so as to permit the gate to be readily swung to one side of the opening 14. Normally, of course, the gate extends vertically across the opening.

The gate 17 is normally releasably held in position projecting across the opening 14 by means of a lock nut 18 applied to the screw threaded portion of the bolt 16. While this lock nut may be of any desired construction, a simple form of nut that may be used and one available on the market is that shown. This particular lock nut consists of an ordinary nut having a small angular wire 18a received within a small aperture therein, the wire 18a being held in place by inwardly pressing portion 18b of the nut. The angular end of the wire 18a engages the screw thread of the bolt 16 as a dragging dog. While permitting the nut 18 to be tightened it does not readily permit the nut to be loosened until sufficient pressure has been applied to the nut to swing the angular end of the wire 18a past dead center from the full line position shown in Fig. 6 to the dotted line position there shown and, of course, the spring of the wire resists such movement past dead center.

In order to back up the gate 17 to resist outward thrust that may be applied against the bottom of the gate, the top of the bolster 7 is equipped with an upstanding rib 19 located immediately outwardly from the normal position of the gate 17.

Fitting within the housing H is a tread plate 20 having a concave upper surface and a projecting tongue 21 at one side thereof, this tongue being normally received within one of the side openings 12. The tread plate 20 may be inserted within the housing through the open top thereof by tilting the tread plate about a longitudinal axis thereof until the tongue 21 finds its way into one of the side openings 12. Resting on the tread plate 20 and received partially within the housing H is a roller 22.

One or more shims 23 may be provided for use in adjusting the height of the tread plate 20 and roller 22. These shims are of such size as to be received loosely within the bottom of the housing 8, and they are of such a width as to be insertable through the opening 14 when the gate 17 is swung out of the way of the opening, but they are not of such width as to pass through the opening 13 in the housing end 10.

To adjust the height of the tread plate 20 and roller 22, it is merely necessary to unloosen the lock nut 18 whereupon the gate 17 can be swung to one side of the opening 14. The roller 22 and tread plate 20 can then be raised slightly by hand and one or more shims 23 may be inserted through the opening 14 into the housing 8 below the tread plate 20, if it is desired to raise the height of the roller 22. Similarly, shims can be withdrawn through the opening 14 if it is desired to lower the position of the roller 22. After the adjustment has been made, the gate 17 can be swung back to its normal position across the opening 14 and the nut 18 can be tightened. The gate 17 backed by the rib 19 will take the end thrust imposed upon the shims 23 in a direction toward the gate 17 while the end wall 10 will take the end thrust of the shims in the opposite direction.

It will be seen that an extremely simple and efficient side bearing structure has been provided.

It will, of course, be understood that various changes may be made in the form, details, arrangement and proportions of the various parts.

What is claimed is:

1. A side bearing for car trucks comprising an open topped housing having side and end walls, a roller tread plate within said housing, a roller working on said tread plate, one of said end walls having an opening in its lower portion, a rib projecting upwardly in slightly outwardly spaced relation from said one end wall at the bottom of the housing, a swingable gate normally projecting across said opening from the top to the bottom thereof at the inner side of said rib and means for releasably securing said gate in such position, said gate upon release of said securing means being movable to one side of said opening to permit insertion and withdrawal of tread plate shims to and from said housing.

2. In a car truck, a truck bolster, an open topped side bearing housing formed integral with the top of said bolster and projecting upwardly therefrom, said housing having side walls and first and second end walls, an upstanding rib formed on the top of said truck bolster adjacent but slightly outwardly spaced from said first end wall, said first end wall having an opening in its lower portion approximating in horizontal length the spacing between said side walls, the said opening projecting upwardly above said rib, a tread plate within said housing, a bearing member within said housing and working on said tread plate, a swingable gate normally extending at the outer side of said first end wall from the upper part of said first end wall across said opening to a point inward from and below the upper part of said rib and releasable securing means for securing said gate in such position whereby upon release of said securing means said gate may be swung to one side of said opening and tread plate shims may be inserted through said opening below said tread plate to vary the level of said bearing member.

EDWIN W. WEBB.